United States Patent [19]
Nakamura

[11] Patent Number: 5,653,564
[45] Date of Patent: Aug. 5, 1997

[54] SCREW HEAD CAP

[75] Inventor: Toshinobu Nakamura, Tokyo, Japan

[73] Assignee: Shinagawa Shoko Co., Ltd., Tokyo, Japan

[21] Appl. No.: 578,043

[22] Filed: Dec. 26, 1995

[30]  Foreign Application Priority Data

May 25, 1995 [JP] Japan .................. 7-149778

[51] Int. Cl.$^6$ ...................... F16B 37/14
[52] U.S. Cl. ........................ 411/373
[58] Field of Search ............... 411/373, 372, 411/371, 377, 431, 542

[56]  References Cited

U.S. PATENT DOCUMENTS

| | | | |
|---|---|---|---|
| 2,857,597 | 10/1958 | Morgan | 411/373 |
| 4,154,138 | 5/1979 | Melone | 411/373 |
| 4,214,505 | 7/1980 | Aimar | 411/373 |
| 4,601,624 | 7/1986 | Hill | 411/373 |
| 5,068,956 | 12/1991 | Malewicz | 411/372 |
| 5,103,538 | 4/1992 | Ryder | 411/373 |

FOREIGN PATENT DOCUMENTS 916941  1/1963  United Kingdom ........... 411/373

*Primary Examiner*—Flemming Saether
*Attorney, Agent, or Firm*—Banner & Witcoff, Ltd.

[57]  ABSTRACT

A screw head cap having a cap portion, a washer portion, a skirt portion turned down from a capping main body portion and an upstand portion turned up from the washer portion. The inner periphery of the skirt portion is inwardly turned down at an angle ranging from eighty to eighty-five degrees to a horizontal plant of the cap portion, while the outer periphery of the upstand portion is outwardly turned up from a base portion thereof at an angle ranging from eighty to eighty-five degrees to a horizontal plane of the washer portion, corresponding to the inwardly turned down angle of the inner periphery of the skirt portion. The thickness of the capping main body potion is nearly homogeneous and is proportional to 0.7 to 0.95 of the maximum thickness of the skirt portion.

2 Claims, 4 Drawing Sheets

SCREW HEAD CAP

BACKGROUND OF THE INVENTION

1. Field of the Invention

The present invention relates to a cap for covering a head of machine screws, bolts, etc. or a nut, which will be referred to as a screw head cap.

2. Prior Art

There have been proposed many kinds of so-called screw head caps for covering a head of machine screws, bolts, etc. or a nut, which are generally regarded as complete products without any defect. However, while novel machinery and tools have been developed as revolutionary progress in technology and, at the same time, conventional apparatuses have been improved, new requirements of usage or applications adaptable to these novel or improved products are resulted in.

It is apparent that such seemingly complete screw head caps are defective in productivity, handling convenience or appearance thereof.

Recent screw head caps are formed by injection molding resins. It is required that the caps can be produced at a low cost, easily mounted or demounted, and further provide a reasonable appearance adaptable to fit on heads of screws or bolts, dissimilarly to conventional ones which are sometimes too large. Accordingly, it is an object of the present invention to provide a screw head cap to meet above mentioned requirements so as to solve conventional problems and defects.

SUMMARY OF THE INVENTION

According to the present invention, a screw head cap is provided with a washer portion having a shank inserting core in the center and an upstand portion turned up around a periphery portion thereof, and a cap portion having a capping main body portion and a skirt portion turned down from said main body portion for covering a screw head, the washer and cap portions being coupled by a hinge means thereby forcing and fitting the cap portion to the washer portion. The skirt portion is inwardly turned down at an angle ranging from 80° to 85° to a horizontal plane of said cap portion so as to fit an inner periphery of the skirt to the outer periphery of the upstand portion, while the outer periphery of the upstand portion is outwardly turned up from a base portion thereof at an angle ranging from 80° to 85° to a horizontal plane of the washer portion similarly as the inwardly turned down angle of the inner periphery of the skirt portion. The thickness of the capping main body portion is nearly homogeneous and is proportional to 0.7 to 0.95 of the maximum thickness of the skirt portion.

Further, a screw head cap of the present invention includes a hinge mechanism being integrally molded with the cap and washer portions using the same material as that of both portions, connecting one end of the hinge means to a base of the upstand portion of the washer portion while cutting off a part of an upper surface of the outer periphery of the hinged upstand portion more widely than width of the hinge means, and connecting the other end of the hinge means at least in the middle of the skirt portion or to a position more closely shifted to a capping main body side while cutting off an outside of the hinged skirt portion more widely than width of the hinge means.

Furthermore, a screw head cap of the present invention may include protrusions formed around the inserting core on the bottom surface of the washer portion.

As the thickness of the cap main body portion and the skirt portion turned down therefrom are proportional, and in particular while the skirt portion and the upstand portion of the washer portion, inwardly turned down and outwardly turned up, respectively, have a specific angle, the cap portion can easily be fixed and unfixed with ease.

Because of equal angles of the turned down skirt portion and the turned up washer portion, the inner periphery can be tightly fitted to improve a water-proofing effect thereof.

Further, because of the position where the hinge means is fitted and the cut off skirt and upstand portions corresponding to this position, total height of the screw head cap under a fixed condition can be lowered.

The screw head cap of the present invention may be used as a foot member when screws and nut fitted on the bottom of machinery and tools are covered by the cap.

The screw head cap of the present invention can be easily fixed and unfixed and has lower height as well as an improved appearance. A die for injection molding the screw head cap is cheap. Further, the present screw head cap prevents penetration of water such as rain and improves a water-proofing effect.

When the screw head cap is made of insulating material, the screw head is insulated to prevent undesirable electrical effects through the screw under conditions of electrostatic force, thunderstorm and the like.

DETAILED DESCRIPTION AND THE PREFERRED EMBODIMENTS

The present invention will now be described in detail by way of embodiments in connection with the accompanying drawings.

Figure 1:
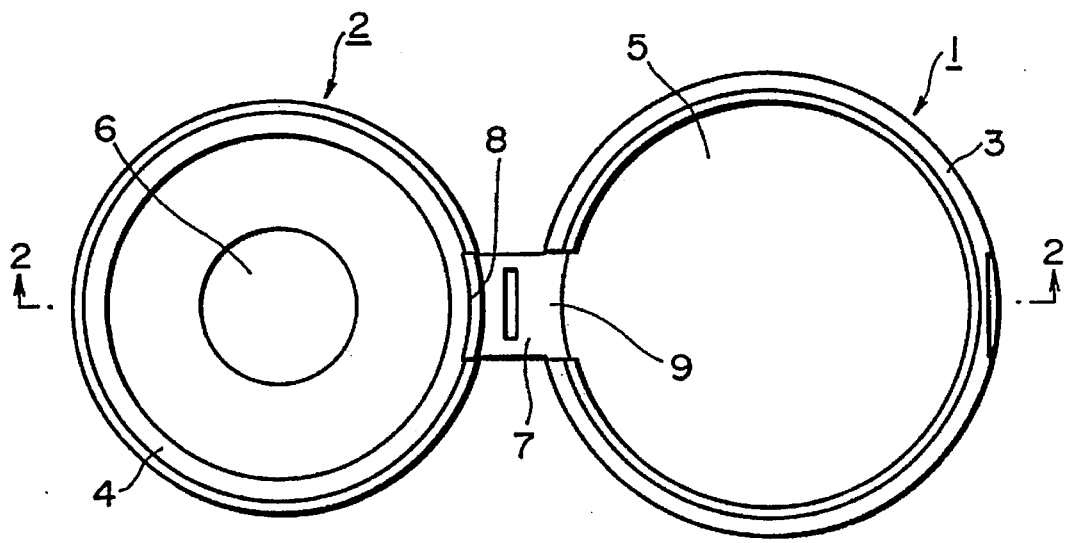
FIG. 1 is an expanded view of a screw head cap.
Figure 2:
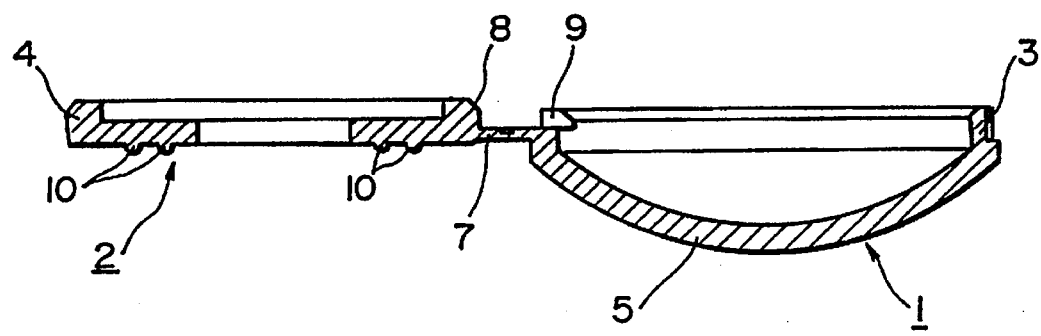
FIG. 2 is a sectional view taken along a line 2—2 in the cap shown in FIG. 1.

FIG. 1 is an expanded view of a screw head cap according to the present invention; FIG. 2 a sectional view taken along a line 2—2 in the cap shown in FIG. 1; and FIG. 3 an enlarged vertical section of a fixture of cap and washer portions in a capped condition.

In the drawings, numerals 1, 2, 3 and 4 designate a cap portion, a washer portion, a skirt portion turned down from a capping main body portion and an upstand portion turned up from the washer portion, respectively.

A screw head cap according to this embodiment is formed by integrally molding polypropylene resin as a whole. Although the cap portion, the washer portion and a hinge means may be integrally connected by means of other materials, such connection should impracticably complicate a production process thereof.

A shape of the cap portion 1 as well as the washer portion 2 is circular. The screw head cap can be a hexagon or any other shape depending on the shapes of the machine screws, bolts, etc. to be used, but in general a convenient shape thereof is circular from various viewpoints.

The capping main body portion 5 is a shape of central-swollen dome, which includes the skirt portion 3 turned down therefrom.

The washer portion 2 has a shank core 6 in the center for inserting machine screws, bolts, etc., which includes the upstand portion 4 turned up from a periphery thereof.

Figure 3:
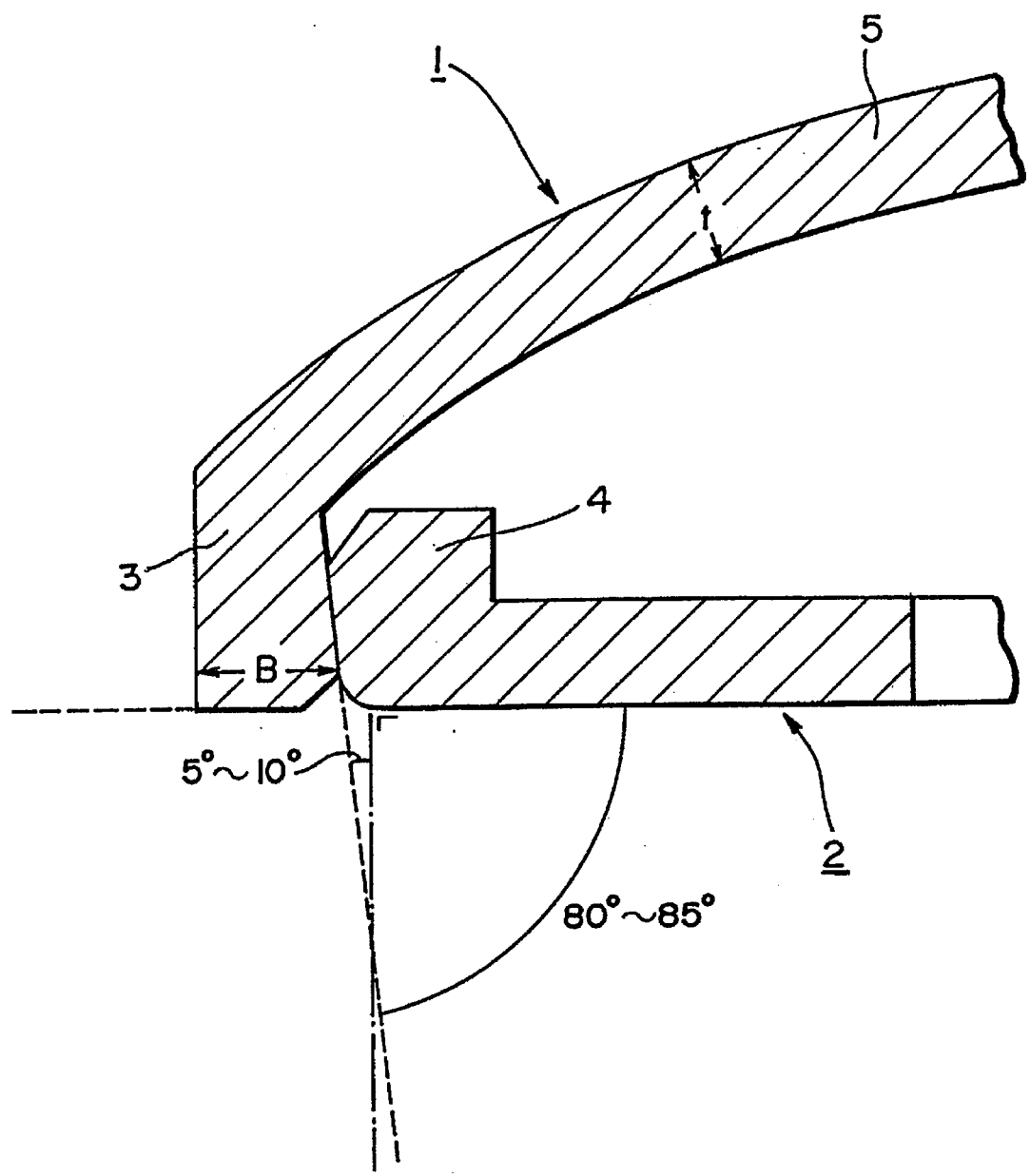
FIG. 3 is an enlarged vertical section.

As clearly shown in FIG. 3, an inner periphery of the skirt portion 3 is inwardly inclined at an angle of 80° to 85° to a horizontal plane of the cap portion 1, or 5° to 10° to a perpendicular from the horizontal plane. That is, the skirt portion 3 increases thickness thereof downwardly as shown in FIG. 3. An inside bottom end of the skirt portion 3 is beveled to facilitate fixing thereof.

On the other hand, an outer periphery of the upstand portion 4 turned from the washer portion 2 is outwardly inclined at an angle of 80° to 85° to a horizontal plane of the washer portion 2, or 5° to 10° to a perpendicular from the horizontal plane symmetrically to the skirt portion 3. That is, the upstand portion 4 increases thickness thereof upwardly as shown in FIG. 3. An outside top end of the upstand portion 4 is beveled to facilitate fixing thereof.

Inclination of the skirt portion 3 and the upstand portion 4 are adjusted at a nearly equal angle in the above mentioned range to tightly contact the inner and outer peripheries of the skirt portion 3 and the upstand portion 4, respectively, when these portions are fixed each other.

The reason why the inclination is adjusted at such an angle fallen in this range will be described in the following.

The more the inclination increases, the more the fixing force of both portions becomes stronger. A stronger fixing force itself is desirable, however, the increase in the inclination makes it impossible to pull out molded products from a molding machine after the products are formed because the screw head cap of a question is injection molded as described above. Even if a die possible to pull out the product effectively is developed, the die should be impracticably expensive.

When the inclination is adjusted at an angle smaller than the above mentioned range, the injection molding is conducted conveniently, but the fixing force decreases. A screw head cap thus molded functions undesirably.

It is found that the inclination angle fallen in this range meets molding as well functional requirements of the screw head cap.

Thickness (t) of the capping main body portion 5 is nearly homogeneous and proportional to about 0.7 of maximum thickness (B) of the skirt portion 3. The thickness (t) may be varied within proportion ranging from about 0.7 to 0.95, i.e., t=(70/100 to 95/100)×B, depending on size, material, etc. of the screw head cap.

Because of such relative thickness of the capping main body portion 5 and the skirt portion 3 as described above, the skirt portion 3 in particular can be easily deformed to fix and unfix the screw head cap to the capping main body portion 5 simply and effectively.

A hinge 7 connecting the cap portion 1 and the washer portion 2 is formed by integrally molding the same material as these portions. The hinge 7 is so structured that one end thereof expands from a lower termination of the washer portion 2 and the other connects to a middle part of the skirt portion 3. An upper part 8 of the upstand 4 where the hinge 7 of the washer portion 2 is connected is cut-off a little more widely than the width of the hinge 7. While, an outside part 9 of the skirt portion 3 where the hinge 7 of the cap portion 1 is connected is throughly cut off a little more widely than the width of the hinge 7. Existence of such cut off allows the cut off parts to keep the hinge 7 therein under a fixed condition of the cap portion 1, thereby rendering the height of the screw head cap lower usefully.

Further, there are provided two protrusions 10 having a nearly semicircular cross section around a shank inserting core 6 on the bottom surface of the washer portion 2. These protrusions function as a seal when the screw head cap is fixed to machine screws, bolts, etc., but are not essential to the present invention.

Figure 4:
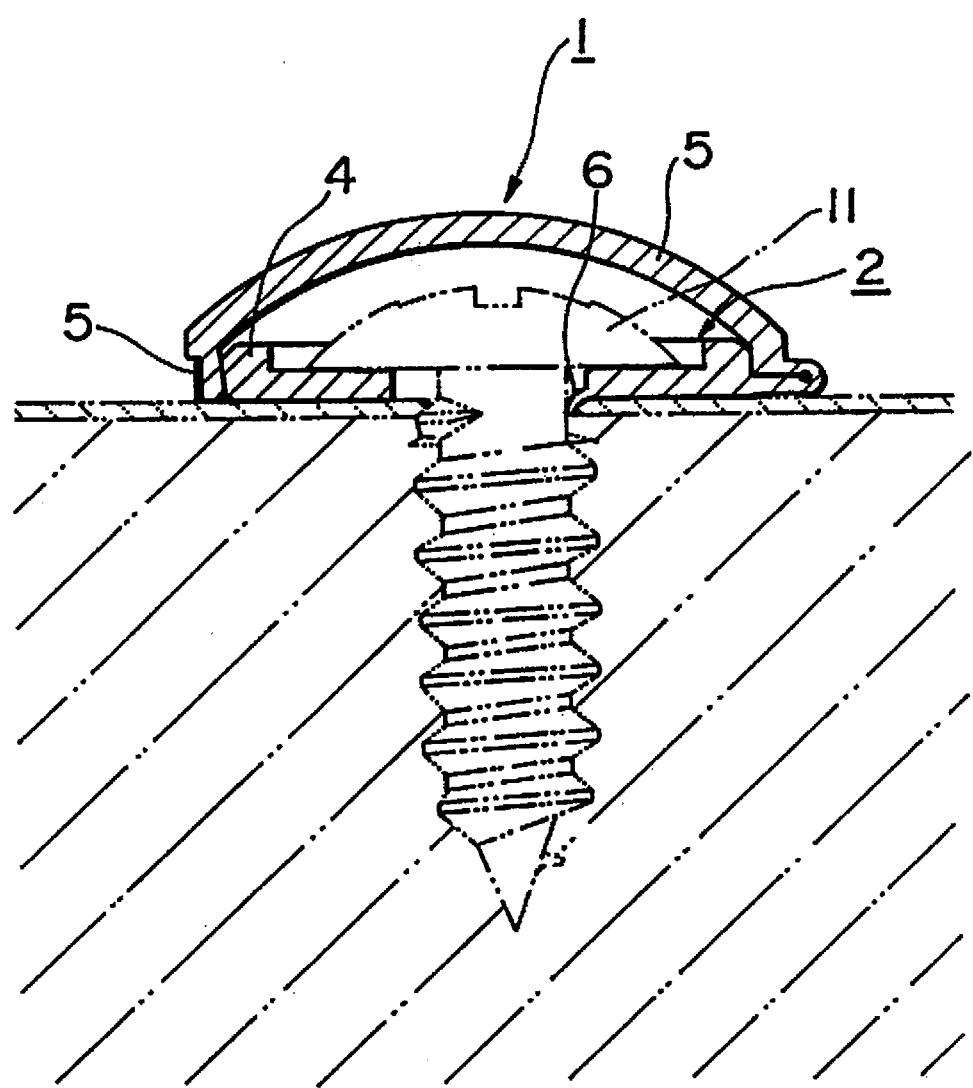
FIG. 4 is a sectional view of a machine screw 11 fixed with a screw head cap.

FIG. 4 is a sectional view of a machine screw 11 fixed with a screw head cap according to an embodiment of the present invention. The screw head cap of the present invention may be fixed similarly as a fixing manner of conventional ones. First of all, the machine screw is inserted to the core 6 of the screw head cap and, in this situation, screwed in a predetermined position. Finally, the cap portion 1 of the screw head cap is fixed to the washer portion 2.

Although as an example the screw head cap for a machine screw is shown in the illustrated embodiment, it should be understand that the screw head cap of the present invention is adaptable for covering bolt heads, nuts and the like.

Figure 5:
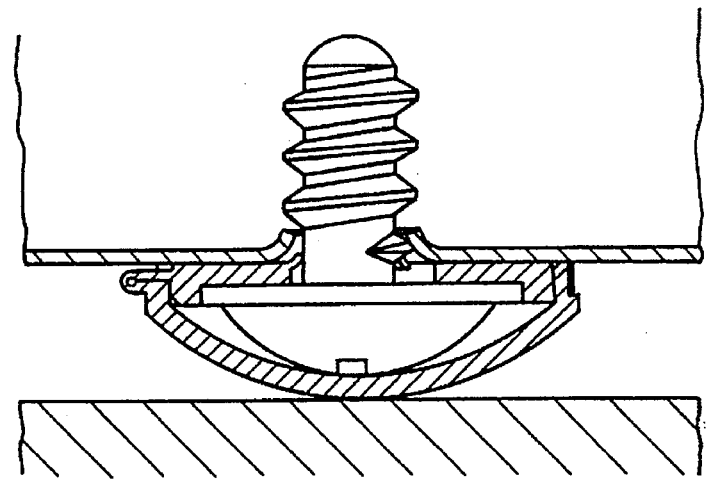
FIG. 5 is a sectional illustration in part of a screw head cap according to the present invention which functions as feet members.
Figure 6:
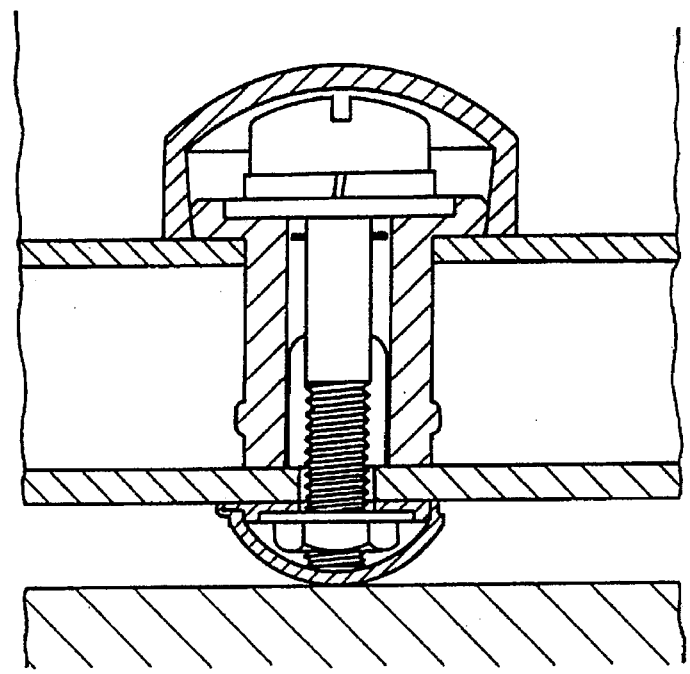
FIG. 6 is another sectional illustration in part of a screw head cap according to the present invention which functions as feet member.

FIGS. 5 and 6 show the screw head cap of the present invention when used to cover screws or nuts on the bottom surface of machinery and tools, and thereby also functions as a foot member therefor.

What is claimed is:

1. In a screw head cap for covering a screw head, provided with a washer portion having a shank inserting core in the center and an upstand portion turned up around a periphery portion thereof, and a cap portion having a capping main body portion and a skirt portion mined down from said main body portion for fixedly securing the cap portion to the washer portion, the washer and cap portions being coupled by a hinge means, the improvement wherein an inner periphery of said skirt portion extends downwardly from said capping main body portion at an angle ranging from 80° to 85° to a horizontal plane of said cap portion so as to fit said inner periphery of the skirt to an outer periphery of the upstand portion, while the outer periphery of the upstand portion extends upwardly from a base portion thereof at an angle ranging from 80° to 85° to a horizontal plane of the washer portion, thereby corresponding to the angle of the inner periphery of the skirt portion, and a thickness of the capping main body portion being substantially uniform and proportional to 0.7 to 0.95 of a maximum thickness of the skirt portion;

said screw head cap further comprising the hinge means integrally molded with the can and washer portions using the same material, one end of said hinge means being connected to the base portion of the upstand portion, and the other end of the hinge means being connected to a middle area of the skirt portion, a cut off portion is provided in the skirt portion where the hinge means is connected which receives at least a portion of the hinge means when the cap portion is fixedly secured to the washer portion;

wherein said corresponding angles of said upstand portion and said skirt portion and said proportional thickness of said capping main body portion allow said can portion to be repeatedly securely and releasably fixed to said washer portion with ease;

wherein said hinge means being connected to said base portion while said skirt portion having the cut off to accomodate said hinge means allows an overall height of said cap portion when fixed to said washer portion to be effectively reduced.

2. A screw head cap as claimed in claim 1 comprising protrusions formed around the inserting core on a bottom surface of the washer portion.

* * * * *